US011588221B1

(12) United States Patent
Ray

(10) Patent No.: US 11,588,221 B1
(45) Date of Patent: Feb. 21, 2023

(54) SMALL SATELLITE COMMUNICATIONS ANTENNA AND CONTAINER DEPLOYMENT MECHANISM

(71) Applicant: U.S. Army Space and Missile Defense Command, Huntsville, AL (US)

(72) Inventor: Mark E. Ray, Madison, AL (US)

(73) Assignee: The United States of America, as represented by the Secretary of the Army, Washington, DC (US)

( * ) Notice: Subject to any disclaimer, the term of this patent is extended or adjusted under 35 U.S.C. 154(b) by 0 days.

(21) Appl. No.: 17/545,088

(22) Filed: Dec. 8, 2021

(51) Int. Cl.

| | |
|---|---|
| ***B64G 1/10*** | (2006.01) |
| ***B64G 1/64*** | (2006.01) |
| ***H01Q 1/08*** | (2006.01) |
| ***H01Q 1/28*** | (2006.01) |
| ***H01Q 1/36*** | (2006.01) |

(52) U.S. Cl.
CPC ............... *H01Q 1/084* (2013.01); *H01Q 1/36* (2013.01)

(58) Field of Classification Search
CPC ............ H01Q 1/08; H01Q 1/084; H01Q 1/36; H01Q 1/288; H01Q 1/42; B64G 1/007; B64G 1/10; B64G 1/641; B64G 1/645; B64G 2001/643; B64G 1/222
See application file for complete search history.

(56) References Cited

U.S. PATENT DOCUMENTS 3,836,979 A 9/1974 Kurland et al.
5,977,932 A 11/1999 Robinson
8,970,447 B2 3/2015 Ochoa et al.
9,415,883 B2 8/2016 Holemans et al.
9,664,726 B2 5/2017 Platzer et al.
10,569,910 B2 2/2020 Bogdanov et al.
11,059,609 B2 7/2021 Beck et al.
2012/0146880 A1* 6/2012 Behrens ................. B64G 1/222 343/895
2016/0031572 A1* 2/2016 Dube ..................... B64G 1/641 244/173.1
2018/0194494 A1* 7/2018 Dube ..................... B64G 1/002
2019/0039757 A1* 2/2019 Beck ......................... B60P 7/16
2019/0210745 A1* 7/2019 Tahk ...................... B64G 1/641

FOREIGN PATENT DOCUMENTS

EP 0666612 A2 8/1995

OTHER PUBLICATIONS

Herbert J. Kramer, ed., "CubeSat Concept and the Provision of Deployer Services," European Space Agency (ESA) Earth Observation Portal (eoPortal), 23 pp., retrieved from Internet on Feb. 9, 2022, <https://directoryeoportal.org/web/eoportal/satellite-missions/c-missions/cubesat-concept>.

(Continued)

*Primary Examiner* — Thai Pham
(74) *Attorney, Agent, or Firm* — C. Joan Gilsdorf

(57) ABSTRACT

A dual-use spring attached to a small satellite that performs two common functions for small satellites including operating as a communications antenna for the small satellite, which eliminates the need for a separate antenna deployment step, and ejecting the small satellite from a modified deployment container mounted on a launch vehicle. The deployment container is modified by removing a conventional deployment spring and pusher plate, which increases available container space.

20 Claims, 5 Drawing Sheets

(56) References Cited

OTHER PUBLICATIONS

Armen Toorian, "CubeSats: From Launch to Deployment," 1st Annual CubeSat Developers' Workshop, Cal Poly, San Luis Obispo, Apr. 8-10, 2004, 26 pp., retrieved from Internet on Feb. 9, 2022, <http://mstl.atl.calpoly.edu/~workshop/archive/2004/Spring/04c-Toorian(CubeSat)-P-POD.pdf>.

"ISIPOD CubeSat Deployer," ISISPACE Group, 4 pp., retrieved from Internet on Feb. 9, 2022, <https://www.isispace.nl/product/isipod-cubesat-deployer/>.

Sara T. Stubb, "Israel's mini-satellite startup offers big coverage at low cost," The Times of Israel, Nov. 29, 2020, 4 pp., retrieved from Internet on Feb. 9, 2022, <https://www.timesofisrael.com/spotlight/israels-mini-satellite-startup-offers-big-coverage-at-low-cost/.

"Origami Antenna Springs up for Small Satellites," European Space Agency, Jan. 12, 2020, 5 pp., retrieved from Internet on Feb. 9, 2022, <https://www.esa.int/Enabling_Support/Space_Engineering_Technology/Oirgami_antenna_springs_up_for_small_satellites.>.

Block et al., "A Self-Deploying and Self-Stabilizing Helical Antenna for Small Satellites," 61st International Astronautical Congress, Prague, CZ, 2010, 6 pp., retrieved from Internet on Feb. 9, 2022, <https://elib.dlr.de/66584/1/IAC-10-C2-2-2.pdf>.

Darrell Etherington, "NSLComm's First Spring Loaded Expanding Antenna Satellite is Headed to Space," TechCrunch, Jul. 3, 2019, 11 pp., retrieved from Internet on Feb. 9, 2022, <https://techcrunch.com/2019/07/03/nslcomms-first-spring-loaded-expanding-antenna-satellite-is-headed-to-space/>.

"Poly Picosatellite Orbital Deployer Mk. III Rev. E User Guide," California Polytechnic State University, 21 pp., retrieved from Internet on Feb. 9, 2022, <https://static1.squarespace.com/static/5418c831e4b0fa4ecac1bacd/t/5806854d6b8f5b8eb57b83bd/1476822350599/P-POD_MkIIIRevE_UserGuide_CP-PPODUG-1.0-1_Rev1.pdf.

Laura Carrabine, "Stow-and-Go for Space Travel," Design World, Oct. 11, 2011, 15 pp., retrieved from Internet on Feb. 9, 2022, <https://www.designworldonline.com/stow-and-go-for-space-travel/>.

"NSLComm Use Cases," Sep. 24, 2020, YouTube, site visited Feb. 9, 2020, <https://www.youtube.com/watch?v=Ab_HwYHnZEw.>.

"How are Spacecraft Stored and Released from Rockets?—Satellite Launch Basics," Dec. 29, 2018, YouTube, site visited Feb. 9, 2020, <https://www.youtube.com/watch?v=dmHtrZYV6nU>.

* cited by examiner

SMALL SATELLITE COMMUNICATIONS ANTENNA AND CONTAINER DEPLOYMENT MECHANISM

STATEMENT OF GOVERNMENT INTEREST

The invention described herein may be manufactured, used, and licensed by or for the U.S. Government for governmental purposes without payment of any royalties thereon.

BACKGROUND

The present invention relates in general to deploying small satellites from a launch vehicle in space orbit and, more particularly, to ejecting cube satellites (CubeSats) from a deployment container on a launch vehicle.

Small satellites, including CubeSats, have several advantages over larger, traditional satellites including the ability to use inexpensive, off-the-shelf components; faster development and manufacturing times; and smaller mass and size, which reduces the cost to transport them into space. This has resulted in increased use of CubeSats for space-based missions such as Earth observation, communication, collection of space data, and scientific research.

Most small satellites conform to a CubeSat design standard initiated by California Polytechnic State University (Cal Poly) and are container launched. The CubeSat standard facilitates small satellite design by providing structural and dimensional criteria including shape, size, and weight. A CubeSat Unit (U) is defined as a cube of 10 cm (length)×10 cm (width)×10 cm (height) with a maximum mass of not more than 1.33 kg. Small satellites are typically designed in multiples of this unit (i.e., 1 U, 2 U, 3 U, 6 U, 12 U, 24 U) to fit into standard deployment containers, which reduces development and launch vehicle transportation costs.

The deployment container, sometimes referred to as a "dispenser" or a "deployer," provides the interface between the CubeSat and a delivery spacecraft such as a launch vehicle, which carries the deployment container with the CubeSat into space. The terms "dispenser" and "deployer" may be used interchangeably in this specification.

The deployment container is integrated to the launch vehicle fairing typically as a secondary payload. The deployment container provides protection to the CubeSat during launch and transportation into space, such as from vibrations or shocks, and is used to deploy the CubeSat into a satellite orbit.

One example of a deployment container is the Poly-Picosat Orbital Deployer (P-POD) developed by Cal Poly. The standard P-POD holds up to three CubeSats and can be bolted onto the launch vehicle. The P-POD deployer accommodates a 3 U CubeSat, or, equivalently, three 1 U CubeSats, two 1.5 U CubeSats, or one 1 U CubeSat and one 2 U CubeSat.

The typical deployment container, such as the P-POD, has a hinged door at one end that provides access to a payload area of the container, and through which one or more CubeSats are loaded and unloaded. The door is closed and secured after the CubeSat(s) is loaded, and the deployment container is secured to the launch vehicle.

When the launch vehicle reaches a predetermined orbital altitude, the launch vehicle sends an electrical control signal to the deployment container, causing the deployment container door to open. One end of a compressed deployment spring is attached to the back of the deployment container and the other end of the spring is attached to a pusher plate.

When the deployment container door opens, the spring pushes the pusher plate and ejects the CubeSat(s) out the deployment container door, deploying the CubeSat(s) into orbit. Once the CubeSat(s) has separated from the deployment container and is in orbit, the CubeSat(s) will extend, expand, or unfurl stowed deployables or appendages, such as antennas and solar panels into useable positions, and begin performing its mission.

Because the CubeSat must fit into a standardized deployment container, CubeSat-Class spacecraft require high mass and volume efficiency due to limited container volume and are typically volume constrained. The CubeSat houses components such as circuit boards, batteries, sensors, and other components needed for the CubeSat's particular mission. It has been difficult to use small satellites when components such as antennas and solar panels need to be deployed because of the very limited available internal space of CubeSats and deployment containers, which is compounded by the amount of internal space occupied by satellite ejection mechanisms, such as springs and pusher plates in the deployment containers. The volume constraints have resulted in some satellite missions being outside CubeSat form-factor resulting in higher cost and more limited launch availability.

Therefore, an improved deployment container ejection mechanism is needed to make additional volume available for satellite mission components or to deliver additional and separate payloads to orbit.

SUMMARY

The invention is a dual-use spring that is used as both a small satellite communications antenna and as a deployment mechanism that ejects the small satellite from a deployment container mounted on a launch vehicle.

Small satellite deployment containers are volume constrained with part of the stowed volume being allocated to the pusher plate and deployment spring used to eject the satellite. This reduces the amount of volume available for the satellite, which is itself already volume constrained, and other components. Consequently, small satellite developers must achieve high levels of mass and volume efficiency, which increases development time and expense. After deployment, the pusher plate and deployment spring remain in the deployment container and are expended.

Typical helical antennas for small satellites require accurate turn spacing, length, and diameter. This is often achieved by using complicated, fragile support structures or alternatively, sacrificing performance as the shape of the helix is distorted so that the antenna can be stowed in very limited spacecraft volume. These types of communications antennas do not have the mechanical spring properties to act as the satellite deployment or ejection mechanism as described in this specification.

Further, the mechanical deployment spring in the conventional deployment container does not have suitable electrical properties to operate as the antenna. These springs are typically made of stainless steel, which is a poor electrical conductor. Additionally, the conventional spring is mechanically fastened to the deployment container and is not deployed with the small satellite. Once the small satellite is deployed, the deployment container, including the spring and the pusher plate, are unused.

The invention uses the same spring for deployment and also for a high directivity communications antenna. By utilizing a compressible and deployable helical communications antenna as the deployment mechanism, deployment container space available for the spacecraft increases by approximately 12%. The invention reduces technical risk by removing the antenna deployment step, associated hardware, and logic, and it also solves the problem of the ejection mechanism (i.e., the spring and the pusher plate) taking up volume in the deployment container and then becoming useless weight on the launch vehicle after satellite deployment. This is accomplished by the present invention replacing both the ejection mechanism of the conventional deployment container and the antenna with a dual-use helical spring that functions as both a small satellite communications antenna and as a deployment mechanism that ejects the small satellite from the deployment container on a launch vehicle.

Thus, the invention obviates the requirement for a second antenna deployment stage, eliminates additional mass and volume of a secondary deployment system, and reduces the risk inherent to a second deployment. The invention better utilizes limited container volume which normally forces the CubeSat-Class spacecraft to achieve high mass and volume efficiency.

In accordance with an embodiment of the invention, there is provided a satellite dispensing system having a modified satellite deployment container to accommodate a satellite, and that is structured without a conventional satellite ejection mechanism and has a door at one end and a back panel at an end opposite the door. A dual-use spring is attached externally to an end panel of the satellite to function as both a communications antenna and as a satellite deployment mechanism. The satellite is positioned inside the modified deployment container with the modified deployment container door closed so that the dual-use spring is compressed against the back panel of the modified deployment container. At a desired orbit, the dual-use spring applies a force to the satellite to eject the satellite from the modified deployment container when the modified deployment container door opens. The dual-use spring is carried with the satellite and uncompresses to an antenna operational length as it pushes the small satellite out the modified deployment container to function as the satellite's communications antenna.

In accordance with another embodiment of the invention, there is provided a satellite dispensing system for deploying one or more small satellites. An end one of the satellites is a dispensing satellite. A modified deployment container, structured without a conventional satellite ejection mechanism, accommodates the one or more small satellites and has a door at one end through which the satellites are deployed and a back panel at an end opposite the door. A dual-use spring is coupled externally to the dispensing satellite at an end panel of the dispensing satellite. The satellites are pushed into the modified deployment container with the dispensing satellite being positioned closest to the back panel of the modified deployment container so that the dual-use spring is adjacent to the back panel, and the door is latched so that the dual-use spring is in a compressed state. The dual-use spring provides a force to eject the satellites from the modified deployment container once a desired orbit is reached and the modified deployment container door is opened. The dual-use spring functions as a communications antenna for the dispensing satellite after ejecting the satellites from the modified deployment container.

In accordance with another embodiment of the invention, there is provided a method of deploying a small satellite, including placing a small satellite in a stowed configuration. A dual-use spring is attached to an end panel of the small satellite. A modified deployment container is provided with a door at one end and a back panel at an end opposite the door, and is structured without a conventional satellite ejection mechanism. The stowed small satellite with the dual-use spring is placed into the modified deployment container so that the dual-use spring is adjacent to the back panel of the modified deployment container. The stowed small satellite is pushed into the modified deployment container until the door of the modified deployment container can be closed to secure the small satellite inside the modified deployment container and compress the dual-use spring against the back panel. The modified deployment container is installed on board a launch vehicle and the launch vehicle is launched into space. The door of the modified deployment container is opened once a desired orbit is reached and the stowed small satellite is ejected from the modified deployment container by force of the compressed dual-use spring. The dual-use spring remains attached to the small satellite, uncompresses into an operating length as it pushes the small satellite out the modified deployment container, and provides antenna communications. The dual-use spring eliminates an additional deployment stage of unfurling a stowed antenna, along with associated hardware and logic, providing additional volume within the modified deployment container.

BRIEF DESCRIPTION OF THE DRAWINGS

Various aspects and advantages of the invention will become apparent from the following detailed description, taken in conjunction with the accompanying drawings. The drawings are not necessarily drawn to scale. In the drawings.

DETAILED DESCRIPTION OF THE PREFERRED EMBODIMENTS

The invention is a dual-use spring, functioning as a communications antenna and container deployment mechanism that satisfies container deployment requirements and small satellite radio frequency communications requirements while repurposing approximately 12% of existing container volume that is unused after small satellite deployment.

Figure 1:
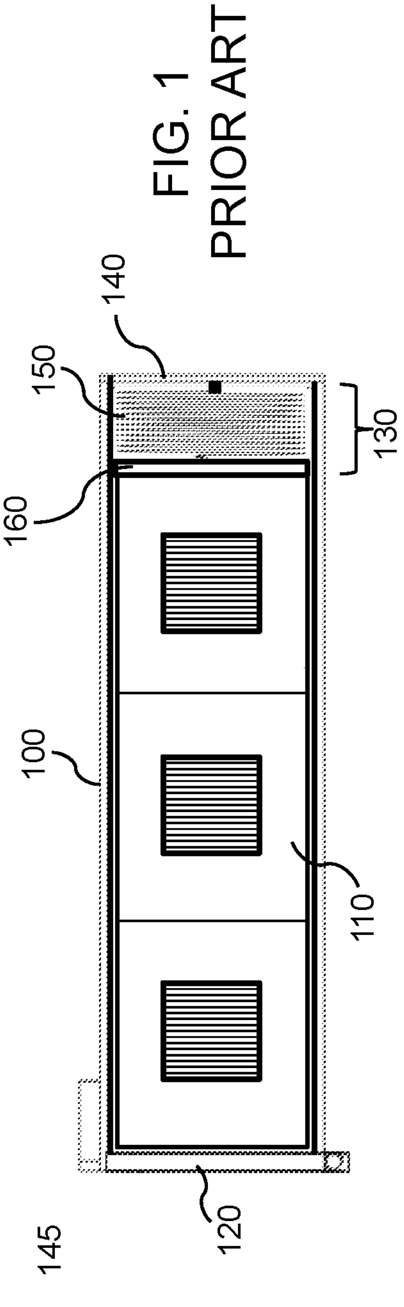
FIG. 1 PRIOR ART
FIG. 1 illustrates a side view of a conventional deployment container with a side panel removed showing a small satellite, a pusher plate, and a deployment spring.

FIG. 1 illustrates a side view of a conventional deployment container 100 with a front side panel removed so that a small satellite 110, which has been loaded through a door 120, is visible. A typical small satellite mission begins with the completed satellite 110 put into a "stowed" configuration, meaning hardware such as solar panels and antennas (not shown in FIG. 1) are compacted within or around the small satellite 110 to fit inside the deployment container 100. In deployment containers such as the P-POD, a certain amount of volume 130 at an end 140 of the deployment container 100 opposite the door 120 is reserved for an ejection mechanism that includes a compressed deployment spring 150 and a pusher plate 160.

Figure 2:
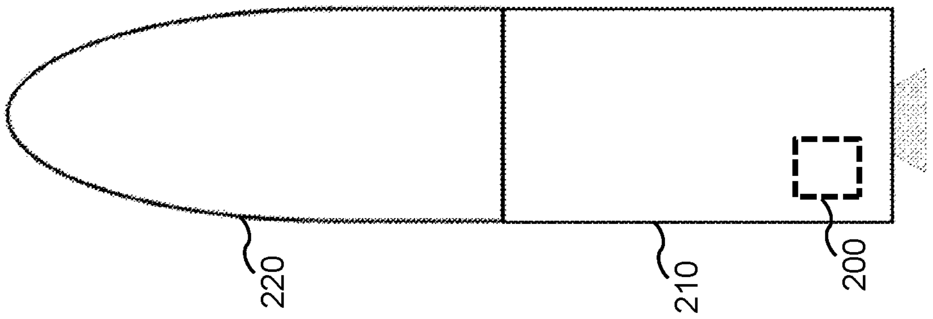
FIG. 2 PRIOR ART
FIG. 2 illustrates a conventional launch vehicle with an upper stage and a fairing.

The spring 150 is attached internally to the end 140 of the deployment container 100 and to the pusher plate 160. The small satellite 110 is integrated to the container 100 by pushing the satellite 110 into the deployment container 100 and against the pusher plate 160 to compress the spring 150, and then closing the deployment door 120. The container 100 is integrated into a rideshare satellite launcher 200 in an upper stage 210 of a launch vehicle (lower stages not illustrated) or a launch vehicle fairing 220, as illustrated in FIG. 2, and the ensemble is launched. Once the desired orbit is reached, the door 120 opens and the small satellite 110 is ejected via the spring 150 and the pusher plate 160 providing deployment velocity and force on orbit. The spring 150 and the pusher plate 160 are now useless weight on the launch vehicle upper stage.

After the small satellite 110 is ejected from the deployment container 100, a dormant state clock begins counting down. The small satellite 110 is required to be in a dormant state (i.e., remain in stowed configuration) until a certain amount of time has elapsed. This is typically a requirement to avoid unintended interference due to emissions from the ejected small satellite 110 and to avoid potential deployment failure modes (e.g., a deployable mechanism snagging on the deployment container 100 and becoming wedged). The small satellite 110 then undergoes a secondary deployment sequence in which appendages such as antennas and solar panels are released into an on-orbit configuration.

After the small satellite 110 has separated from the deployment container 100, a small satellite appendage such as an antenna typically needs a separate spring or a motor to supply the motive force needed to extend the antenna from its collapsed, stowed state. Any mechanical failure may result in the antenna not being properly deployed. Other approaches use self-deploying appendages that are compacted (e.g., collapsed or folded) and stowed before launch and deploy after the small satellite 110 has separated from the deployment container 100 using stored strain energy resulting from the compaction. Either approach requires two deployment sequences—one for the satellite and a secondary one for the antenna.

Figure 3:
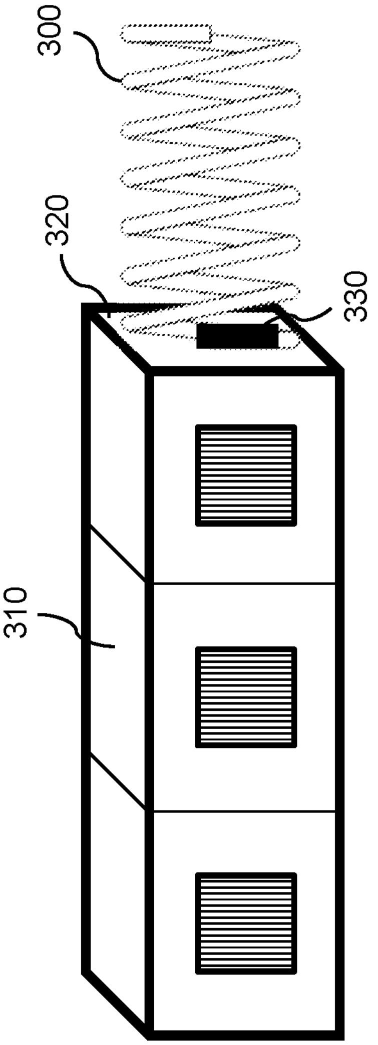
FIG. 3 illustrates a small satellite with a dual-use spring according to an embodiment of the present invention.

FIG. 3 illustrates an example dual-use spring 300 and a CubeSat 310 in accordance with an embodiment of the invention. In the embodiment shown in FIG. 3, the example CubeSat 310 has a size of 3 U in accordance with the CubeSat standard.

The dual-use spring 300 is affixed externally to an end panel 320 of the CubeSat 310. The end panel 320 of the CubeSat 310 functions as a conductive antenna reflector plate and the interface for the antenna connector 330. Alternatively, radials or netting (not shown) may be used to extend a separate reflector plate (also referred to as a ground plane) to increase directivity of the dual-use spring 300 as an antenna. The CubeSat 310 is stowed as described above except for the dual-use spring 300, which remains connected to, but outside, the CubeSat 310.

FIGS. 4A-4D illustrate an example deployment container 400 in accordance with an embodiment of the invention with a side panel removed to view a payload area within the container 400. The deployment container 400 has been modified by removing the deployment spring 150 and the pusher plate 160 from the conventional deployment container 100. In the embodiment shown in FIGS. 4A-4D, the deployment container 400 has a size 3 U in accordance with the CubeSat standard and accommodates the 3 U CubeSat 310.

Not shown are components such as connectors and sockets that provide communications with the launch vehicle or mechanisms for mounting the deployment container 400 to the launch vehicle.

Figures 4A, 4B, 4C, 4D:
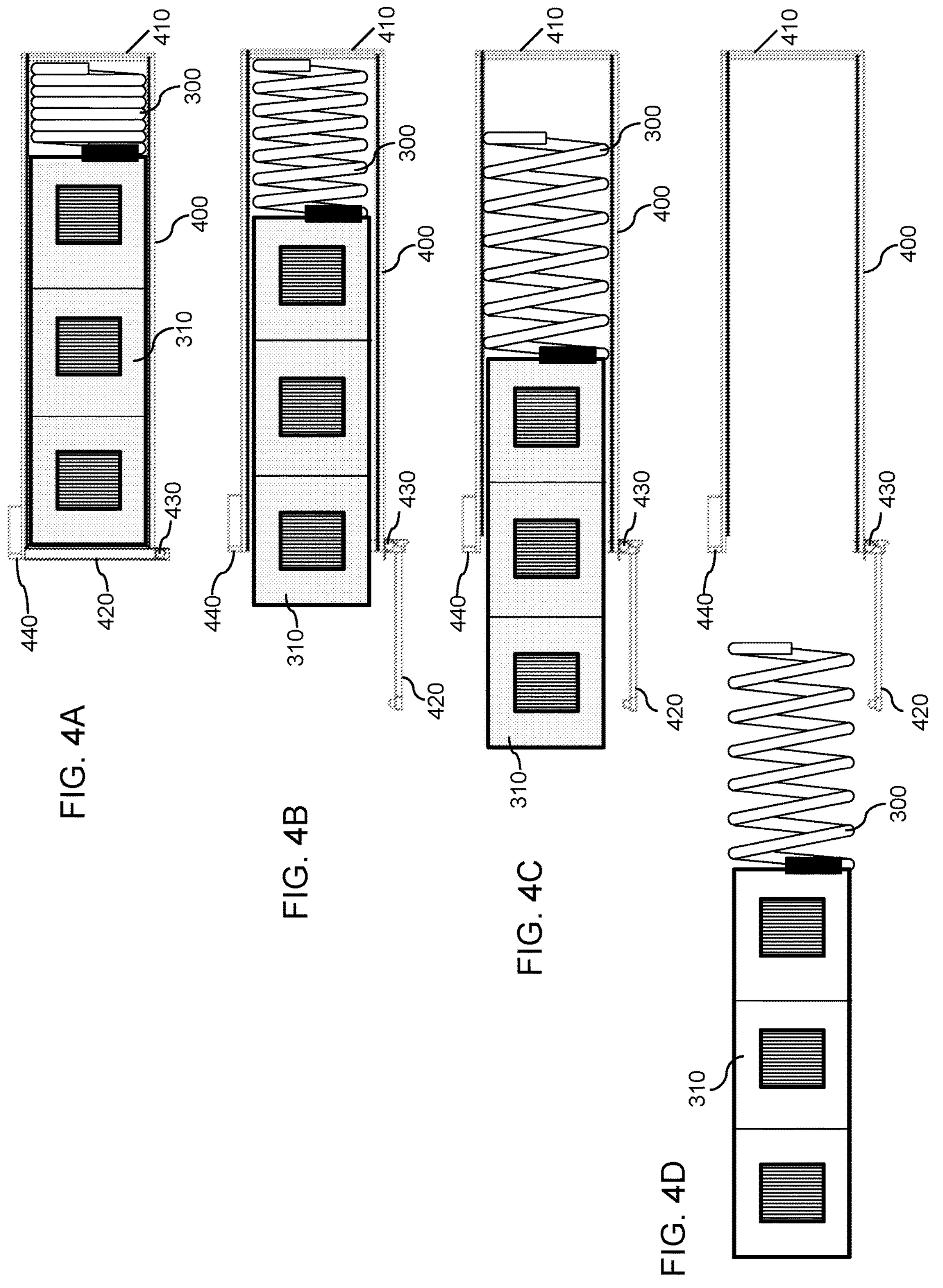
FIG. 4A illustrates a side view of a closed deployment container with a side panel removed showing the small satellite and the dual-use spring of FIG. 3, with the dual-use spring fully compressed, according to an embodiment of the present invention.
FIG. 4B illustrates a side view of the deployment container, the small satellite, and the dual-use spring of FIG. 4A, with a door of the deployment container open and the small satellite beginning to be ejected from the deployment container by the expanding dual-use spring, according to an embodiment of the present invention.
FIG. 4C illustrates a side view of the deployment container, the small satellite, and the dual-use spring of FIG. 4B, with the small satellite and the dual-use spring being further ejected from the deployment container by the dual-use spring, according to an embodiment of the present invention.
FIG. 4D illustrates a side view of the deployment container, the small satellite, and the dual-use spring of FIG. 4C, with the small satellite and the dual-use spring being completely ejected from the deployment container, according to an embodiment of the present invention.

The CubeSat 310 with the dual-use spring 300 is positioned in the deployment container 400 such that the dual-use spring 300 is between the CubeSat 310 and a back panel 410 of the deployment container 400. FIG. 4A illustrates the CubeSat 310 integrated to the deployment container 400 with the dual-use spring 300 in a compressed state. The CubeSat 310 is pushed into the deployment container 400 on guide rails (not shown) so that the dual-use spring 300 is compressed, and then a spring-loaded deployment door 420 is closed and latched so that the dual-use spring 300 remains compressed, securing the CubeSat 310 within the deployment container 400. The deployment door 420 is coupled to the deployment container 400 by a hinge 430, and may rotate about the hinge 430 to open/close the deployment container 400. A signal controlled door release mechanism 440 controls the opening of the deployment door 420 (electrical connections not shown) once the desired orbit is reached. The deployment container 400 is integrated to the launch vehicle and the ensemble is launched as described above.

FIGS. 4B and 4C illustrate deployment of the CubeSat 310 immediately after the deployment door 420 is opened. Once the desired orbit is reached, the launch vehicle sends an electrical deployment signal to the door release mechanism 440 to release the deployment door 420, which swings open at least 90 degrees, and the CubeSat 310 is ejected via the dual-use spring 300. The dual-use spring 300 operates as a satellite deployment mechanism by supplying the spring force needed to push the CubeSat 310 toward a passageway created by the open door 420, which ejects the CubeSat 310 from the deployment container 400 and deploys the CubeSat 310 in satellite orbit. FIGS. 4B and 4C illustrate the dual-use spring 300 expanding to push the CubeSat 310 out the deployment door 420.

FIG. 4D illustrates the CubeSat 310 after it has completely separated from the deployment container 400 with the dual-use spring 300 deployed to its operational length. The dual-use spring 300 is carried with the CubeSat 310 as the dormant state clock counts down rather than being left behind on the deployment container 400 as useless volume and mass. Once the requisite time has elapsed, the dual-use spring 300 performs the function of the communications antenna for the CubeSat 310.

Thus, the dual-use spring 300 operates as both the satellite deployment mechanism and as the communications antenna, while reducing technical risk and mechanical failure by removing the antenna deployment step, associated hardware, and logic.

Figure 5A:
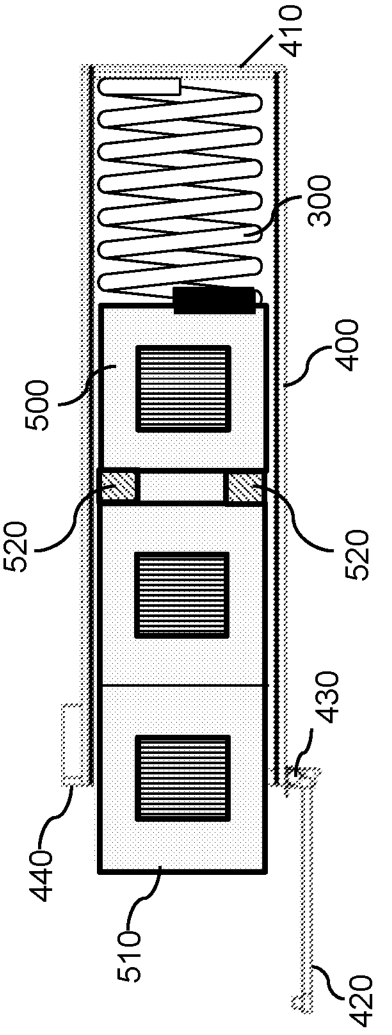
FIG. 5A illustrates a side view of the deployment container, two small satellites, and the dual-use spring, with a door of the deployment container open and the small satellites beginning to be ejected from the deployment container by the expanding dual-use spring, according to an embodiment of the present invention.
Figure 5B:
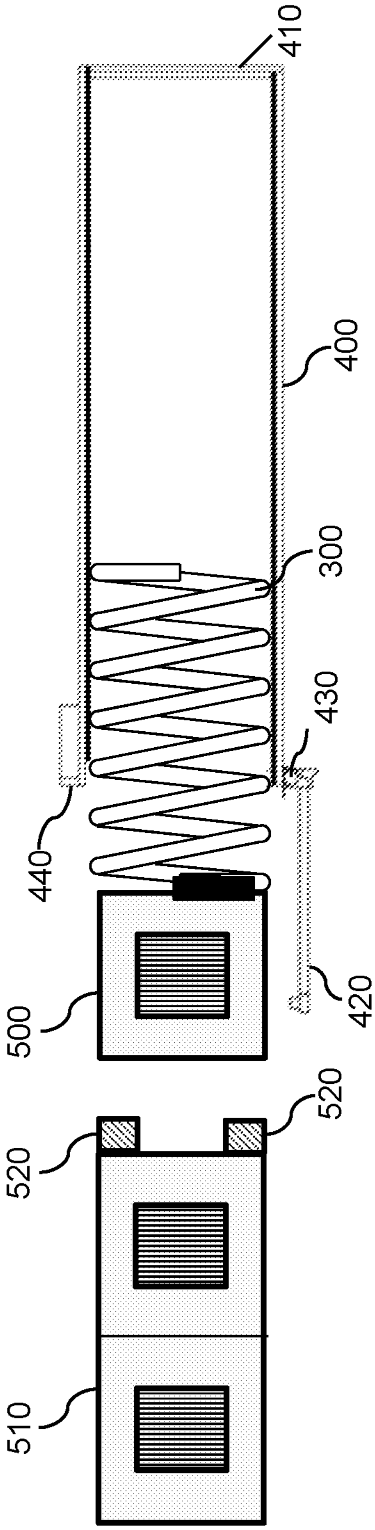
FIG. 5B illustrates a side view of the deployment container, the two small satellites, and the dual-use spring of FIG. 5A, with the small satellites and the dual-use spring being further ejected from the deployment container by the dual-use spring, according to an embodiment of the present invention.

When more than one CubeSat is loaded into the deployment container 400, only the CubeSat closest to the back panel 410 of the deployment container 400 would be attached to the dual-use spring 300, which would supply the force needed to eject all the CubeSats from the deployment container 400. FIGS. 5A and 5B illustrate two CubeSats, a 1 U CubeSat 500 and a 2 U CubeSat 510 with separator springs 520, being ejected from the deployment container 400 via the dual-use spring 300. In the embodiment shown in FIGS. 5A and 5B, the dual-use spring 300 is attached to the 1 U CubeSat 500 and functions as the communications antenna for the 1 U CubeSat 500.

The dual-use spring 300 is designed to have the mechanical properties needed to accomplish the force and deployment velocity for the deployment container 400, as well as the electromagnetic properties required for the desired small satellite radio frequency communications antenna that can be compressed and stowed to occupy a very small, compact volume within the deployment container 400.

The dual-use spring 300 is fabricated from a material such as aluminum or a copper alloy to provide good electromagnetic radiator and spring characteristics. However, as will be appreciated by those skilled in the art, other materials may also be applicable to provide these features. Common steel springs can deliver the required mechanical properties but are typically not desirable due to low electrical conductivity.

Alternatively, the dual-use spring 300 may be made from a material that gives the desired flexibility and stiffness to operate as the deployment mechanism, and spring energy necessary for compression and for returning to the desired deployed length and shape, but that is covered with an electrically conductive material, such as copper tape, to provide both electrical conductivity and spring characteristics.

Figure 6:
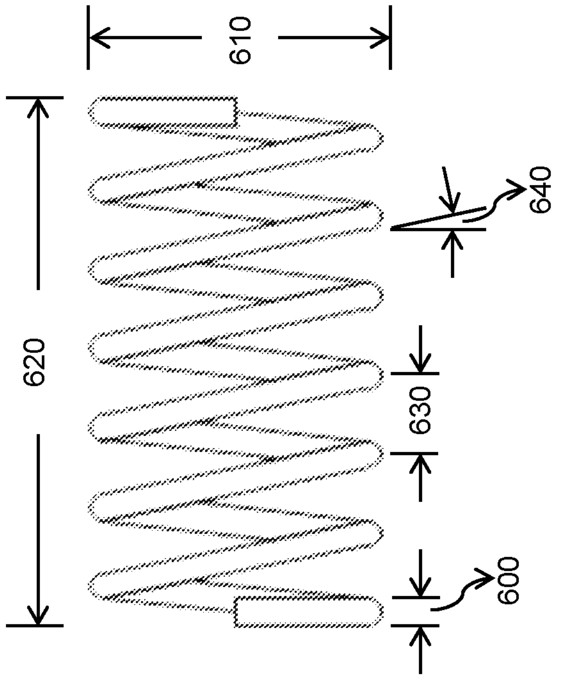
FIG. 6 illustrates dimensions, pitch, and pitch angle of the dual-use spring, according to an embodiment of the present invention.

The electrical performance of the axial mode, dual-use helical spring 300 is influenced by its geometric parameter values and can be tuned as required. Referring to FIG. 6, the wire diameter 600 and the spring diameter 610 set the center frequency and bandwidth. The spring diameter 610 is bounded by the diameter of the deployment container 400 and must be less than 10 cm. The spring length 620, number of turns, vertical separation 630, and pitch angle 640 between turns are also important for beam shaping and spring force. The dual-use spring 300 provides a communications frequency of approximately 3 GHz or less and a higher antenna gain than traditional CubeSat antennas while avoiding the complexity, mass, and volume problems associated with an extending, expanding, or unfurling antenna. For example, an antenna designed with a conductor diameter 600 of 6 mm to operate at 1 GHz with 10 turns and a spacing 630 of 0.23 wavelengths and meeting the diameter 610 constraint of 10 cm results in a gain of 13.2 dBi, a half power beam width of 34.2 degrees, and a bandwidth of 136 MHz.

The ejection speed of the CubeSat 310 from the deployment container 400 is dependent on the stiffness and size of the coils and should be fixed according to the deployment speed specification. The deployment speed is on the order of 1.5 m/s for standard mass CubeSats.

The dual-use spring 300 can be fabricated in constant pitch, conical, barrel, hourglass, or variable pitch configurations to achieve the desired force, velocity, and radiation pattern. Any of these configurations may be preferred based on the communications application. Additionally, the dual-use spring 300 can be left-handed or right-handed depending on preferred polarization. In an alternative embodiment, the dual-use spring 300 is a right-hand wound conical spring for a wideband communications application.

The dual-use spring 300 and corresponding deployment container 400 of the invention provide several advantages, including the following:

(a) The dual-use spring 300 functions as both a helical communications antenna and as the satellite ejection mechanism, replacing the conventional container deployment spring and pusher plate.

(b) The invention better utilizes limited deployment container volume which normally forces the CubeSat-Class spacecraft to achieve high mass and volume efficiency. The invention increases volume utilization in containerized satellites by up to approximately 12%.

(c) The invention obviates the requirement for a second antenna deployment stage, which reduces technical and mechanical risk inherent to a second deployment by removing the antenna deployment step, associated hardware, and logic. This eliminates additional mass and volume of a secondary deployment system.

(d) The invention simplifies small satellite design because a separate antenna deploying mechanism is not required, enabling simple and reliable antenna deployment from a compressed state.

While the foregoing written description of the invention enables one of ordinary skill to make and use what is described herein, those skilled in the art will understand and appreciate the existence of variations, combinations, and equivalents of the disclosed embodiments and methods. The invention should therefore not be limited by the above description, but by all embodiments and methods within the scope and spirit of the invention as disclosed.

What is claimed is:

1. A satellite dispensing system, comprising:

a modified satellite deployment container to accommodate a satellite, the modified satellite deployment container structured without a conventional satellite ejection mechanism and having a door at one end and a back panel at an end opposite the door; and a dual-use spring attached externally to an end panel of the satellite to function as both a communications antenna and as a satellite deployment mechanism, wherein the satellite is positioned inside the modified deployment container with the modified deployment container door closed so that the dual-use spring is compressed against the back panel of the modified deployment container, and at a desired orbit, the dual-use spring applies a force to the satellite to eject the satellite from the modified deployment container when the modified deployment container door opens, the dual-use spring being carried with the satellite and uncompressing to an antenna operational length as it pushes the small satellite out the modified deployment container to function as the satellite's communications antenna.

2. The satellite dispensing system of claim 1, wherein the end panel of the satellite functions as an antenna reflector plate.

3. The satellite dispensing system of claim 1, wherein the dual-use spring has mechanical properties sufficient to provide a force and a velocity needed for deployment of the satellite and electromagnetic properties needed to function as the communications antenna.

4. The satellite dispensing system of claim 1, wherein the dual-use spring has a helical shape and is made of a material that provides electrical conductivity and electromagnetic radiation properties sufficient to function as the satellite communications antenna.

5. The satellite dispensing system of claim 1, wherein the dual-use spring is made from a material that provides desired flexibility, stiffness, and spring energy needed for compression and expansion to a desired deployment length and shape to function as the satellite deployment mechanism, and is covered with an electrically conductive material to function as the satellite communications antenna.

6. The satellite dispensing system of claim 1, further comprising an antenna connector affixed to the end panel of the satellite to which the dual-use spring is attached.

7. The satellite dispensing system of claim 1, wherein the deployment container further comprises a signal-controlled door release mechanism that secures the door in a closed position and opens the door once the desired orbit is reached.

8. The satellite dispensing system of claim 1, wherein the satellite is a CubeSat.

9. The satellite dispensing system of claim 8, wherein the CubeSat and the modified deployment container both have a size of 3 U.

10. The satellite dispensing system of claim 1, wherein the dual-use spring is a right-hand wound conical spring for wideband communications.

11. The satellite dispensing system of claim 1, wherein the dual-use spring eliminates a need for an additional antenna deploying mechanism that unfurls a stowed antenna, along with associated hardware and logic, to provide additional volume within the deployment container.

12. A satellite dispensing system for deploying one or more small satellites, comprising:

one or more small satellites, an end one of the satellites being a dispensing satellite;

a modified deployment container to accommodate the one or more satellites, the modified deployment container structured without a conventional satellite ejection mechanism and having a door at one end through which the one or more small satellites are deployed and a back panel at an end opposite the door; and a dual-use spring coupled externally to the dispensing satellite at an end panel of the dispensing satellite, wherein the one or more small satellites are pushed into the modified deployment container with the dispensing satellite being positioned closest to the back panel of the modified deployment container so that the dual-use spring is adjacent to the back panel, and the door is latched so that the dual-use spring is in a compressed state, the dual-use spring provides a force to eject the one or more small satellites from the modified deployment container once a desired orbit is reached and the modified deployment container door is opened, and the dual-use spring functions as a communications antenna for the dispensing satellite after ejecting the one or more small satellites from the modified deployment container.

13. The satellite dispensing system of claim 12, wherein the end panel of the dispensing satellite functions as an antenna reflector plate.

14. The satellite dispensing system of claim 12, wherein the dual-use spring is made of a material that provides mechanical properties sufficient to provide a force and a deployment velocity needed for deployment of the one or more satellites and electrical conductivity and electromagnetic radiation properties needed to function as the communications antenna for the dispensing satellite.

15. The satellite dispensing system of claim 12, wherein the dual-use spring is made from a material that provides desired flexibility, stiffness, and spring energy needed for compression and expansion to a desired deployment length and shape to function as the deployment mechanism for the one or more satellites, and is covered with an electrically conductive material to function as the communications antenna for the dispensing satellite.

16. The satellite dispensing system of claim 12, wherein the modified deployment container further comprises a signal-controlled door release mechanism that secures the door in a closed position and opens the door once the desired orbit is reached.

17. The satellite dispensing system of claim 12, wherein the one or more satellites are CubeSats.

18. A method of deploying a small satellite, comprising:

placing a small satellite in a stowed configuration;

attaching a dual-use spring to an end panel of the small satellite;

providing a modified deployment container with a door at one end and a back panel at an end opposite the door, and structuring the modified deployment container without a conventional satellite ejection mechanism;

placing the stowed small satellite with the dual-use spring into the modified deployment container so that the dual-use spring is adjacent to the back panel of the modified deployment container;

pushing the stowed small satellite into the modified deployment container until the door of the modified deployment container can be closed to secure the small satellite inside the modified deployment container and compress the dual-use spring against the back panel;

installing the modified deployment container on board a launch vehicle and launching the launch vehicle into space; and opening the door of the modified deployment container once a desired orbit is reached and ejecting, by force of the compressed dual-use spring, the stowed small satellite from the modified deployment container, the dual-use spring remaining attached to the small satellite, uncompressing into an operating length as it pushes the small satellite out the modified deployment container, and providing antenna communications, wherein the dual-use spring eliminates an additional deployment stage of unfurling a stowed antenna, along with associated hardware and logic, providing additional volume within the modified deployment container.

19. The method of deploying a small satellite of claim 18, further comprising fabricating the dual-use spring from a material that provides mechanical properties sufficient to provide a force and a deployment velocity needed for deployment of the more satellite and electrical conductivity and electromagnetic radiation properties needed to function as the communications antenna for the small satellite.

20. The method of deploying a small satellite of claim 18, further comprising fabricating the dual-use spring from a material that provides desired flexibility, stiffness, and spring energy needed for compression and expansion to a desired deployment length and shape to function as the deployment mechanism for the small satellite, and covering the dual-use spring with an electrically conductive material to function as the communications antenna for the small satellite.

* * * * *